W. A. CLARK.
Ice-Augers.
No. 139,769.  Patented June 10, 1873.
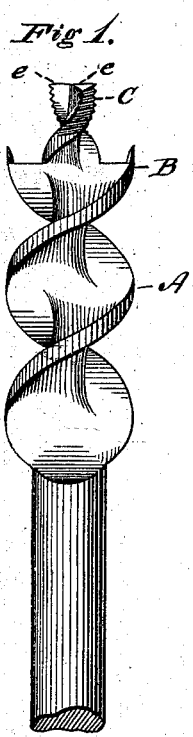
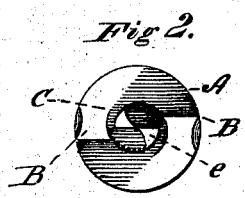
Witnesses  Inventor:
Harry King.  Wm A. Clark,
W. W. P. King  by Dodge & Son
  Attys.

UNITED STATES PATENT OFFICE.

WILLIAM A. CLARK, OF NEW HAVEN, CONNECTICUT.

IMPROVEMENT IN ICE-AUGERS.

Specification forming part of Letters Patent No. 139,769, dated June 10, 1873; application filed April 17, 1873.

*To all whom it may concern:*

Be it known that I, WM. A. CLARK, of New Haven, in the county of New Haven and State of Connecticut, have invented a certain Improved Tool for Boring in Ice, of which the following is a specification:

My invention consists in the construction of an auger or tool for boring in ice, the same being formed with a screw-point, which has cutting-lips on its end, with a screw-thread cut on its vertical exterior surface, and with lips for cutting the hole of the required size, as hereinafter more fully shown.

Figure 1 is a side elevation, and Fig. 2 an end view, of a tool made on my plan.

It is desirable, for many purposes, to cut holes in or through ice frequently several feet thick. This is usually accomplished by means of an ax, and is a slow and difficult task. To provide a tool for more easily and readily accomplishing this purpose is the object of my present invention; and to do this I construct an auger of any required diameter, with cutting-lips B of any of the usual forms, those shown being like those of an ordinary bit or auger. The novelty, and in fact the essential part, of the invention consists in the point C.

I have found by experiment that when an attempt is made to bore into ice with the ordinary gimlet or screw-point, the point will not take hold on the ice, the screw simply fracturing and breaking away the ice around it so that the screw can get no hold in it.

To remedy this difficulty I construct the point C as shown in Fig. 1, where it will be seen that the extreme end of the point is itself composed of two small cutting-lips $e$, slightly beveled or inclined, and being nearly horizontal across the end. The point is twisted, though this is not absolutely essential, and this point, on its sides, is nearly vertical, being a little inclined or enlarged as it approaches the main cutting-lips, and it has a screw-thread cut on its exterior, as shown in Fig. 1. The main cutting-lips B may be made stationary, and with spurs, as shown, or an adjustable cutting-lip may be used, so as to cut holes of various sizes.

The tool thus constructed will bore in ice nearly as well as an ordinary bit will in wood. The lips $e$, on the end of the point, cut a hole the sides of which are left vertical, and as the point advances or enters this hole, the screw-thread takes a firm hold on the solid walls of the hole, thereby drawing or holding the cutting-lips firmly to their work. By giving the body the usual twist, the ice is drawn out as fast as cut, and thus the boring may be continued through ice of any thickness without removing the tool.

Such a tool is specially useful for fishermen who cut holes through ice for obtaining fish in the winter time, and also for boring holes for inserting cartridges for breaking up the ice, as is sometimes necessary in cases of an ice-gorge in streams or rivers.

Having thus described my invention, what I claim is—

A bit or tool for boring in ice, provided with a point, C, having cutting-lips $e$ on its end, and a screw-thread on its sides, with the cutting-lips B, or their equivalents, substantially as described.

WILLIAM A. CLARK.

Witnesses:
PHIL. T. DODGE,
J. McKENNEY.